United States Patent [19]

Culbertson et al.

[11] 4,116,364
[45] Sep. 26, 1978

[54] DISPENSING SYSTEM FOR LOW STABILITY FLUIDS

[75] Inventors: Samuel W. Culbertson, Arvada; James W. Polstra, Boulder, both of Colo.

[73] Assignee: Binks Manufacturing Company, Franklin Park, Ill.

[21] Appl. No.: 654,699

[22] Filed: Feb. 2, 1976

[51] Int. Cl.² ............................................. B67D 5/46
[52] U.S. Cl. ................................ 222/40; 222/144.5; 222/159; 222/173; 222/334
[58] Field of Search ...................... 222/334, 144.5, 40, 222/159, 173; 417/319, 344, 346

[56] References Cited

U.S. PATENT DOCUMENTS

| | | | |
|---|---|---|---|
| 1,586,770 | 6/1926 | Badoux et al. | 222/334 X |
| 1,825,013 | 9/1931 | Patton | 222/144.5 X |
| 2,736,466 | 2/1956 | Rodth | 222/334 X |
| 2,889,084 | 6/1959 | Tour | 222/334 |
| 3,289,889 | 12/1966 | Schweiger | 222/334 X |

Primary Examiner—Robert B. Reeves
Assistant Examiner—Frederick R. Handren
Attorney, Agent, or Firm—Gary, Juettner & Pyle

[57] ABSTRACT

A system for safely dispensing fluids, especially low stability fluids such as catalysts, comprises a pair of fluid operated pumps of very small volume alternately operable for drawing in individually small quantities of catalyst from an unpressurized, sanitary source of supply, and for then pressurizing and dispensing the catalyst in individually small increments; the two pumps operating alternately to provide a continuous pressurized discharge of catalyst despite the fact that only a small quantity is pressurized at any given time. Because only a small quantity of catalyst is under pressure, and the basic supply is not under pressure and is maintained in a sanitary condition, the potential for violent reaction of the low stability fluid is greatly reduced. Also, the small quantity of fluid involved taken in conjunction with force dissipating structural features incorporated in the system, produces a manageable reaction, despite the conventional violence of such reactions, whereby the system greatly minimizes the hazards heretofore involved in the use of such low stability fluids.

19 Claims, 11 Drawing Figures

DISPENSING SYSTEM FOR LOW STABILITY FLUIDS

FIELD OF THE INVENTION

This invention relates to a system for safely dispensing low stability fluids such as catalysts, and more particularly, to means for continuously supplying such a fluid under pressure which greatly minimizes the potential for inadvertent reaction of the fluid, and which eliminates or minimizes damage should a violent reaction of the fluid occur within the system.

BACKGROUND OF THE INVENTION

The plastics and other industries are reliant upon the use of catalysts comprising very low stability fluids, such as organic peroxides. For example, some fluid catalysts, such as methyl ethyl ketone peroxide, which may be combined with polyester resins for producing plastic articles and/or plastic coatings on articles, have a tendency if mechanically shocked or exposed to heat or friction, to react or decompose instantaneously in an explosive manner. Because of the high volume, mass production techniques requisite to the economics of the industry, large quantities of these low stability fluids have had to be maintained under pressure for continuous supply to the production equipment, such as spray guns, pouring heads, etc.

The customary prior art technique used to supply the required quantities of low stability fluid was to deliver the fluid from a pressurized tank containing, for example, one or more gallons of such fluid under air pressure. 2 and 5 gallon pressure tanks have been conventional. However, it is potentially dangerous to have that large a quantity of low stability fluid under pressure in one container since, should a mishap occur, the entire quantity reacts violently and explosively.

A further danger inherent in the pressure tank system resides in the potential for contamination of the fluid, because the fluid must be transferred from supply containers, such as 1 gallon plastic bottles, into the pressure tank under working conditions that are generally far from clean and sanitary. Also, the fluid is in contact with and frequently becomes mixed with the pressurizing air which is another source of contamination. Such contamination creates another opportunity for violently explosive reaction of the fluid due to the extremely rapid oxidation of the contaminant and the generation thereby of a self-sustaining explosive reaction of all of the fluid in the tank.

BRIEF DESCRIPTION OF THE INVENTION

The dispensing system of the present invention overcomes the foregoing disadvantages and provides for the safe delivery of production quantities of low stability fluids continuously at the required pressure.

The dispensing system comprises a pair of fluid operated, preferably pneumatically operated, pumps of small volume, for example of a few fluid ounces or less, and a pneumatic control system for causing said pumps to operate alternately whereby to provide a continuous discharge of low stability fluid under pressure while maintaining no more than a few fluid ounces under pressure. Thus, the amount of fluid under pressure in the system at any given time is so small as to greatly minimize the potential for a violent reaction.

The system is further characterized in that the source of supply of the low stability fluid comprises the original fluid containers themselves so that the potential for inadvertent contamination of the fluid is reduced to essentially zero. In particular, the system is adapted to receive two of the conventional 1 gallon plastic bottles in which the fluid is supplied by the manufacturer, it being only necessary to remove the conventional bottle cap and replace the same with a complementary pump inlet fitting. Fluid is drawn from only one container at a time, so that when one container has been exhausted and the other put into use, the exhausted container can be replaced without causing any interruption in production. Also, the fluid never comes in contact with the compressed air or motor operating fluid. Thus, the hazard from contamination is so small as to again greatly minimize the potential for a violent reaction.

However, even with the above-stated safeguards, it must be recognized that when dealing with fluids of the character herein discussed there is always an inherent possibility of a violent or explosive reaction. While any such reaction in the system of the invention would be of a relatively low magnitude because of the individually small quantities of fluid under pressure, the reaction is intense and for this reason the system is equipped with energy or force dissipating means for absorbing or diverting an explosive discharge without irreparable damage to the system and without damage to the premises in which the system is installed.

In its preferred embodiment, the system comprises two pump assemblies each of which consists of a fluid cylinder and piston serving as a single acting pump for pumping the low stability fluid, an air motor comprising a cylinder containing a reciprocable piston for reciprocating the fluid piston in its cylinder, and safety release means comprising a shear pin detachably connecting the two pistons and pressure relief ports which are uncovered upon shearing of said pin for relieving fluid pressure in the fluid cylinder should the fluid therein react violently; a fluid inlet manifold for the two fluid pumps including inlet fitting means for cooperation with conventional fluid supply containers; an outlet manifold for the two fluid pumps; and a pneumatic control system for cycling the two air motor pistons in such manner that the two alternately effect discharge of fluid under pressure whereby to provide a continuous discharge of pressurized fluid, the pneumatic control system also serving to stop both air motor pistons should the fluid in either of the two pump cylinders react violently, whereby to shut down the system completely in the event of mishap.

These and other objects and advantages of the invention will become apparent from the following detailed description and the accompanying drawings.

DETAILED DESCRIPTION

Figure 1:
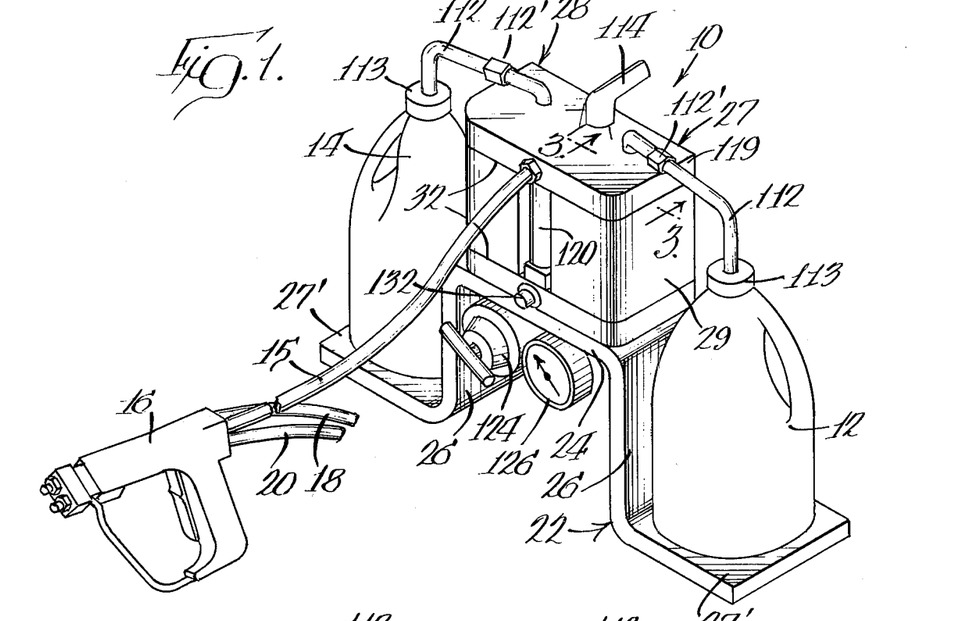
FIG. 1 is a perspective view of the low stability fluid dispensing system of the present invention connected to a plural component spray gun.

Referring to FIG. 1, the fluid dispensing system of the present invention, indicated generally at 10, is particularly suited to supplying a low stability fluid or catalyst, such as methyl ethyl ketone peroxide, from either of containers 12 and 14, continuously under pressure, through a hose 15 to a spray gun 16. The spray gun 16 is also supplied with a compatible resin through a hose 18 so that the catalyst and resin may be sprayed and intermixed simultaneously by the gun operator. In many catalyzed systems, wherein the catalyst comprises a minor proportion relative to the resin, air may also be supplied to the catalyst line 15 adjacent the gun by an air hose 20 for purposes of diluting the catalyst.

Focusing attention on the dispensing system 10, the same includes a base 22 on which various components of the system are mounted. The base has a center section 24, a pair of downwardly extending legs 26, and a pair of outwardly extending horizontal platforms 27' for supporting the pair of fluid containers 12 and 14. A particular feature of the system is that it is constructed to utilize the original standard containers 12 and 14 in which the low stability fluid is supplied so that transfer of fluid to a special container is unnecessary. This feature minimizes the possibility of contaminating the fluid and eliminates unnecessary work. The base 22 can be wall mounted if desired.

Figure 2:
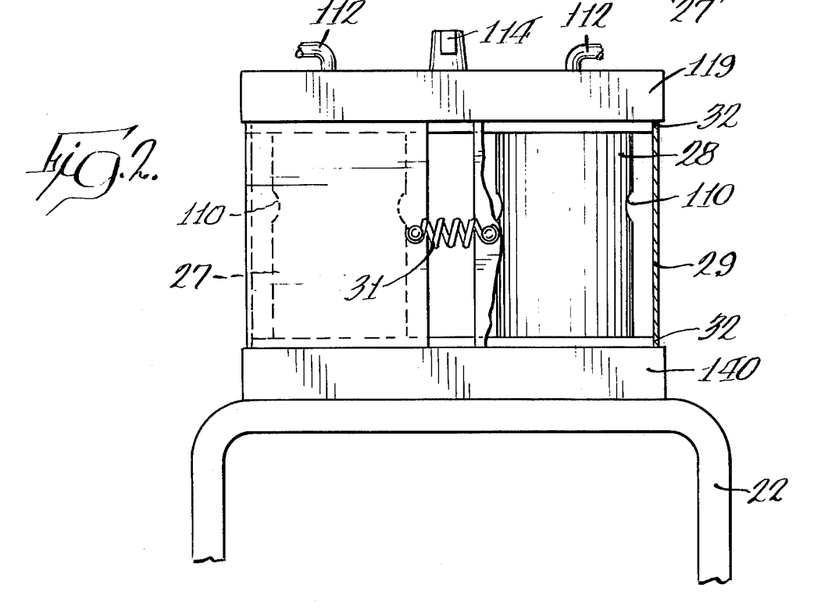
FIG. 2 is a rear view of the dispensing system illustrating the attachment of a deflective safety shield for the system.

The system 10 is characterized by a pair of pump assemblies 27 and 28, which for convenience will be called right and left assemblies, respectively. As shown in FIGS. 1 and 2, the pump assemblies 27 and 28 have common top and bottom headers and are mounted as a unit on the base 22. The two assemblies are partially surrounded by a sheet metal shield 29, which is both decorative and constitutes a deflective safety shield as will subsequently appear. The shield is removably held in place by a spring 31 (FIG. 2) and fits in grooves 32 formed in the upper and lower portions of the pump assemblies.

The two pump assemblies are identical in construction, and for that reason only the right assembly 27 will be fully described. For convenience in describing the operation of the pump later, some of the corresponding components of the assembly 28 will be given a different reference numeral, but the construction is the same as will now be described. Pump assembly 27 comprises a single acting piston pump for pumping the low stability fluid and a reciprocable piston air motor for reciprocating the pump piston.

Figure 3:
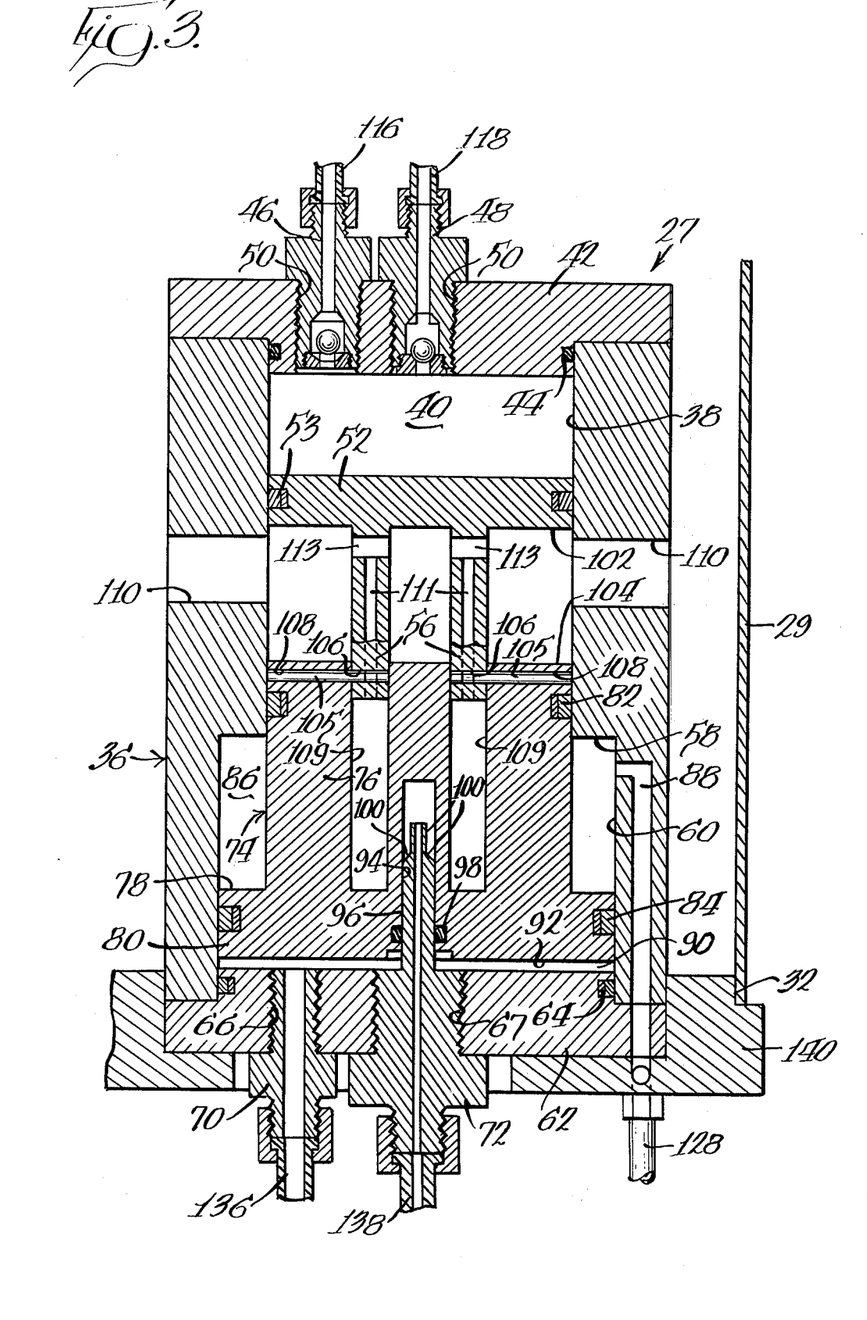
FIG. 3 is a vertical sectional view of one of the pump assemblies taken substantially along the line 3—3 of FIG. 1.

Referring to FIG. 3, the pistons and cylinders for the pump and the air motor are contained within or provided by a common heat dissipating, aluminum body 36.

The body 36 is generally cylindrical and at its upper end has an interior bore or cylinder 38 which extends slightly more than half way down the length of the body 36 to provide a fluid pumping chamber 40. For convenience of describing the operation of the pump later, the fluid pumping chamber of the assembly 28 will be given the reference numeral 41. The bore 38 is impregnated with a polytetrafluoroethylene, such as "Teflon" or "Ni Tuff" to impart lubricity to the surface and isolate the aluminum from the catalyst.

The upper end of the bore 38 is closed by a cylinder head 42. Polytetrafluoroethylene coated aluminum may also be used for the head 42 at it is not subject to attack by the catalyst and dissipates heat well. The head 42 is sealed to the cylinder 38 by a seal ring 44 carried in a groove in the head 42, and held thereto by suitable fastening means, such as bolts (not shown). Within the cylinder head 42 are located a pair of one way valves 46 and 48, and valve 46 being a fluid inlet valve and the valve 48 being a fluid outlet valve. The valves 46 and 48 are received in threaded openings 50 in the cylinder head so that they can be easily removed and replaced, should that be necessary.

A pump piston 52, which is preferably made of polyethylene, vinylidene fluoride-chlorotri fluoru ethylene copolymer, or other material compatible with the catalyst, is mounted for reciprocation in the cylinder 38. The piston 52 is sealed to the cylinder 38 by a two piece seal ring assembly 53 carried in a groove in the piston. To minimize hazards should the fluid in the pump chamber react violently, the bore 38 and piston 52 forming the chamber are sized so that the chamber will hold a maximum of only two fluid ounces of catalyst. A tubular skirt 56 depends from the piston 52 for connecting the same to the air motor, as will subsequently be described.

Below the chamber 40, the bore in the body 36 is enlarged, at 58, to provide a bore or cylinder 60 for the piston of the double acting air motor. The lower end of the cylinder 60 is closed by a cylinder head 62, which is sealed to the wall of the cylinder by a seal ring assembly 64 carried in a groove in the head and held to the body 36 by suitable fastening means, such for example as through bolts (not shown) which secure both of the heads 42 and 62 to the cylinder body 36. A pair of threaded openings 66 and 67 are provided in the head 62 for threaded reception of a supply/vent connector 70 and a pilot connector 72, respectively.

An air motor piston 74 made of a suitable low friction material, such as Delrin, is reciprocably mounted in both of the cylinder bores 38 and 60. Specifically, the piston includes an upper smaller diameter portion 76 slidably mounted in the pump 38 and a lower, larger diameter portion 80 reciprocably mounted within the air motor bore 60. The two portions of the piston are sealed in the respective bores by seal ring assemblies 82 and 84, respectively. The lower face 92 of the piston part 80, when compressed air is supplied thereto via the connector 70, serves to drive the piston upwardly on the fluid discharge stroke, and the annular upper surface 78 thereof serves to drive the piston downwardly on the fluid suction or intake stroke. Because of the differential in area between the two piston surfaces, compressed air may be supplied continuously to the upper motor chamber 86 through a port 88 in the body 36, while being supplied only intermittently to the lower motor chamber 90 via the connector 70. For convenience in describing the operation later, the chambers of the assembly 28 equivalent to the chambers 86 and 90 of the assembly 27 will be given the reference numerals 87 and 91, respectively.

Centrally of the lower portions thereof, the air motor piston 74 is provided with an elongated recess 94 for receiving an extended hollow stem portion 96 of the pilot connector 72. For all but the uppermost portion of the stroke of the piston 74, the stem 96 is sealed to the piston by a seal ring 98 carried in a groove in the recess 94. The upper tip of the stem 96 is relieved or cut away, as indicated at 100, to permit passage of a small quantity of compressed air out of chamber 90 near the end of the upward stroke of piston 74 for purposes which will be later described.

The upper end portion of the air motor piston 74 is provided with an annular recess 109 for telescopic reception therein and connection thereto of the lower end of the skirt 56 of the pump piston 52, so that the air motor piston, upon supply of compressed air to the chambers 86 (or 87) and 90 (or 91), will effect reciprocation of the pump piston on its filling and pumping strokes, respectively. To prevent possible damage to, and to minimize the pressure in the pump chamber 40 (or 41) should the fluid therein violently react, the connection between the two pistons is releaseable or collapsible. The collapsible connection of the pistons permits a rapid, substantial increase in the volume of the pumping chamber as the fluid piston 52 travels downwardly beyond the normal end position of its downward stroke, into the contiguous chamber or space normally existing between the pistons 52 and 74, to a "collapsed" position wherein the lower surface 102 of piston 52 contacts the upper surface 104 of piston 74. For the purpose, a plurality of radially extending shear pins 105 are arranged about the periphery of the piston 74 and skirt 56 and engage in complementary holes 106 and 108 in the skirt and the piston. The diameters of the holes and the size and number of shear pins are selected to provide adequate strength for normal operation of the pump, but to shear and permit the skirt 56 to telescope into the recess 109 should a violent fluid reaction occur in the pump chamber. Should it be desired, less than all the pins can be inserted to vary the pressure at which the pump piston will collapse into the air motor piston. Ports 111 and 113 (both shown in dotted lines) formed in the skirt 56 vent the recess 109 and the interior of the skirt 56 to prevent any retardation of piston movement as the piston 52 is driven downwardly during collapse.

In addition to the pressure relief provided by the rapid increase in the volume of the pump chamber 40 due to the shearing of pins 105 and collapse of the pump piston into the motor piston, a plurality of large area pressure relief ports 110 are provided in that portion of the body 36 adjacent the space between the two pistons. When the pump piston collapses, the ports 110 are immediately uncovered to release the pressure due to explosion to the atmosphere. To protect property and personnel in the vicinity, the pressure relief ports 110 are all positioned within the deflective, protection safety shield 29.

Figures 4, 5:
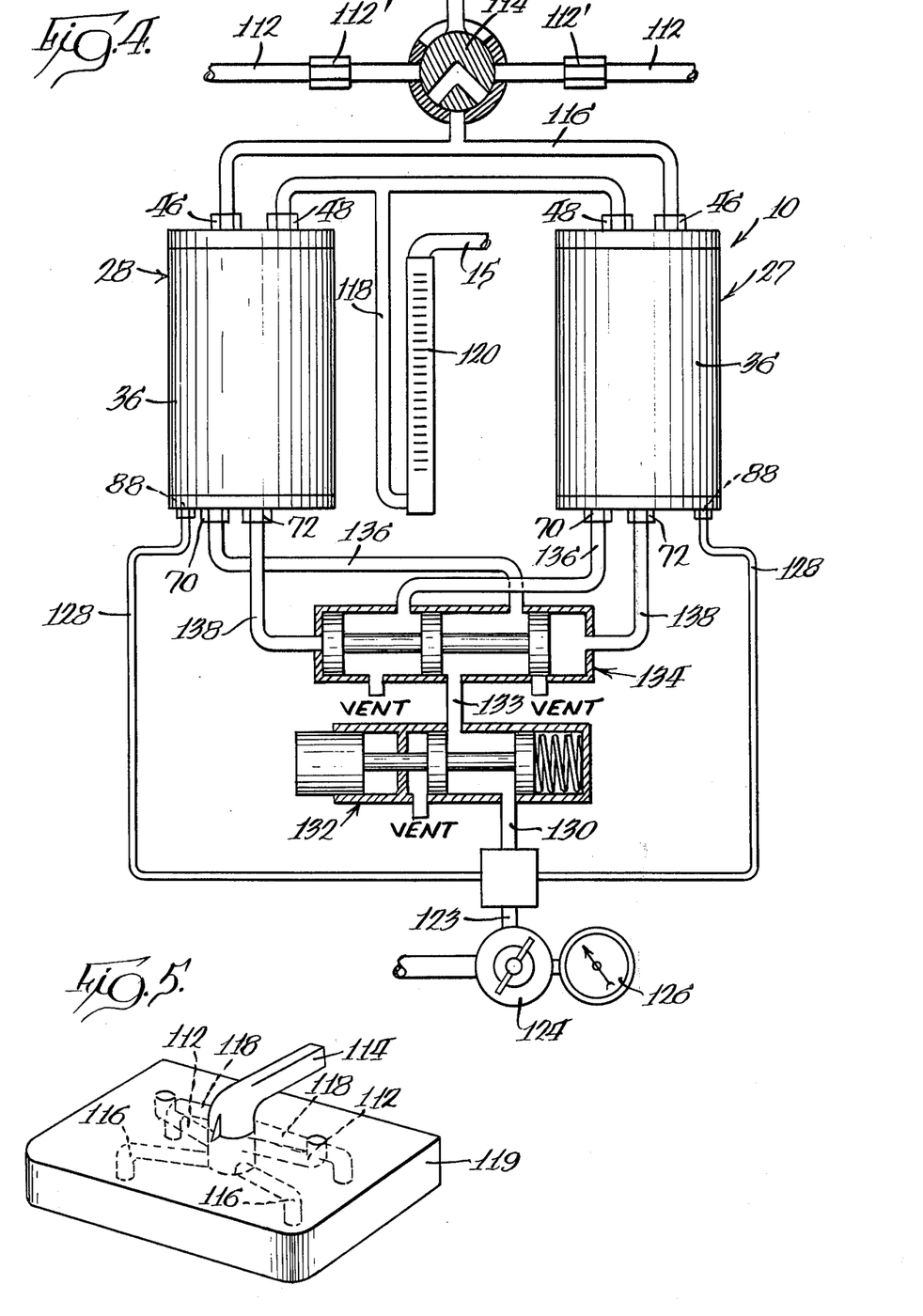
FIG. 4 is a schematic diagram depicting the pneumatic controls for the dispensing system of FIG. 1.
FIG. 5 is a perspective view of the header at the upper or pump end of the system with the porting therein shown in dotted lines.

For supplying fluid to the pump chambers of the two pump assemblies, the inlet valves 46 thereof are connected to a common line or intake manifold 116 which has a tee connection to a manually operated three way valve 114 (FIGS. 1 and 4). The valve in turn has two intake or suction lines or conduits 112 connected thereto which lead respectively to the fluid supply containers or bottles 12 and 14. The valve has three positions for interconnecting the manifold 116 with one or the other of the two bottles via the respective suction line 112, or for shutting the system off. Each suction conduit 112 includes a vertical outer end portion of sufficient length to extend adjacent to the bottom of a bottle or container 12 or 14 to syphon therefrom all of the fluid in the container. Each vertical portion has journalled thereon and sealed thereto a cap 113 for threaded closing engagement with the conventional thread on the neck of the bottle or container. Also, each conduit 112 has a swivel 112' adjacent its inner end to facilitate installation of full bottles in operative position and removal of depleted bottles therefrom. To install a bottle in place, the conventional cap on the bottle is unscrewed and removed; the conduit 112 is then swung forwardly so the vertical portion of the conduit can be inserted into the interior of the bottle, the bottle moved upwardly on the conduit and the bottle slid into place on the platform 27'; and the cap 113 on the conduit is then screwed onto the neck of the bottle. The operation is very quick and simple. There is no need to transfer the fluid from one container to another. The bottle is uncapped for only a few seconds, and having a small diameter neck, is not readily susceptible to being contaminated. Once in place, the bottle is again sealed against contamination. Thus, the fluid is supplied to the system in its original container in a most sanitary condition and with minimal exposure to contaminants. Also, a continuous source of supply is assured in that a depleted bottle 12 or 14 can be replaced with a full one while the system is drawing fluid from the other one of the bottles 14 or 12.

For discharge of fluid from the pump chambers of the two pump assemblies, the outlet valves 48 thereof are similarly connected to a common outlet line or manifold 118 which has a tee connection to an outlet conduit leading to a flow meter 120 and from the flow meter to the catalyst supply hose 15 for the spray gun 16.

For convenience and economy of construction, for protection of components from damage and protection of personnel from exposure to the catalyst, and for esthetic effect, the lines 116 and 118 may be simple plastic tubes cast in place in an epoxy material forming a cast or molded protective upper cover or header 119 for the two pump assemblies. The selector valve 114 may also be cast in place in or formed in part by the cover 119, and similarly the suction tubes or conduits 112 may be journalled in the cover and connected by plastic tubes to the valve. Alternatively, the conduits or lines may be comprised of bores or holes drilled or cast in the molded cover 119. In either case, appropriate fittings are provided for connecting the lines 116 and 118 to the pump assemblies and for connecting the outlet 118 to the flow guage 120. The latter is safely housed in the space between the two cylinders within an indentation in the shield 29. The grooves 32 for holding the upper edge of the shield 29 in place are appropriately cast in the lower edge of the cover 119.

Referring to FIGS. 1 and 4, the dispensing system 10 further includes a pneumatic control system for causing automatic operation and regulation of the pump assemblies 27 and 28, as will now be described.

Compressed air is supplied from a source, such as a plant air line, through a manually operated pressure regulator 124 to a pressure guage 126 and a line 123. From the line 123, compressed air is distributed through a pair of lines 128 to the down stroke air inlet ports 88 of the two air motors, and through a line 130 to a valve system 132 and 134. The lines 128 are not valved so that compressed air is supplied continuously to the chambers 86-87 of the air motors to force the pistons downwardly on their intake or suction strokes. To drive the pistons upwardly, compressed air is supplied to a 3-way push button valve 132, and thence to a control or cycling valve 134. In the normal position of the valve 132, air flows through the valve to a central air inlet opening 133 in the control valve 134. The control valve 134 which is preferably of the spool type, has openings for a pair of supply/vent lines 136 and at its ends pilot lines 138. The two lines 136 are connected respectively to the air inlet connector 70 of the two air motors, and the two lines 138 are connected respectively to the two pilot connectors 72. The control valve 134 is constructed so that when air pressure is applied to one end of the spool from one of the lines 138 and pilot connectors 72, the spool is moved to cut off the supply of compressed air to the inlet connector 70 of that air motor and to vent the air from the lower side of the piston in that motor through the valve 134, as is shown at the left side of the valve in FIG. 4. At the same time, the valve 134 initiates the supply of compressed air to the inlet connector 70 of the other air motor, as is shown at the right side of the valve in FIG. 4. The operations are reversed when air pressure is applied to the other end of the spool from the other pilot line 138 and connector 72. The pilot lines 138 may if desired embody restrictive orifices to provide more positive valve actuation. When the push button valve 132 is depressed, it closes off the supply of compressed air from the line 130 and vents the air chamber 90 or 91 below the piston of the air motor that is not then being vented by the control valve 134. For appearance and protection, as above explained, the push button valve 132, control valve 134 and lines 123, 128, 130, 136 and 138 are all contained with an integrally cast epoxy material forming a bottom cover 140 which also partially contains the lower cylinder heads 62 of the two pump assemblies.

Figure 6:
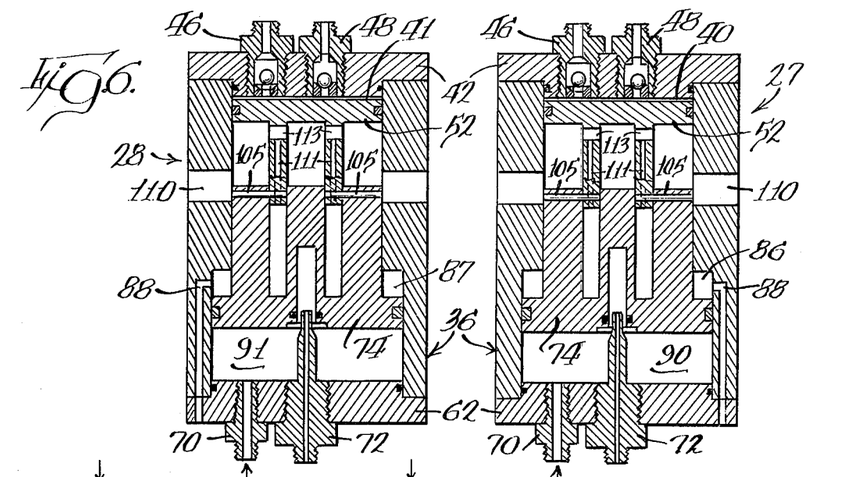
FIG. 6 is a schematic diagram depicting the two pump assemblies in an initial position.

As the description of the construction of the assemblies is complete, the operation thereof will now be described. Referring to FIGS. 4 and 6, with the compressed air turned on at the source and the pressure regulator 124 set at the desired pressure, say from 10 to 100 psi, compressed air is supplied through the push button valve 132 and the control valve 134 through connectors 70 into one and then the other of the chambers 90 and 91 to force one and then the other set of pistons 52 and 74 upward. With the selector valve 114 in its off position, neither set of pistons can effect fluid intake and the pistons will stall at their topmost positions. The pistons will remain in their uppermost position even though air at the same pressure is being supplied to the chambers 86 and 87 since the exposed area of each of the pistons 74 is greater in the chambers 90 and 91 than in chambers 86 and 87.

Figure 7:
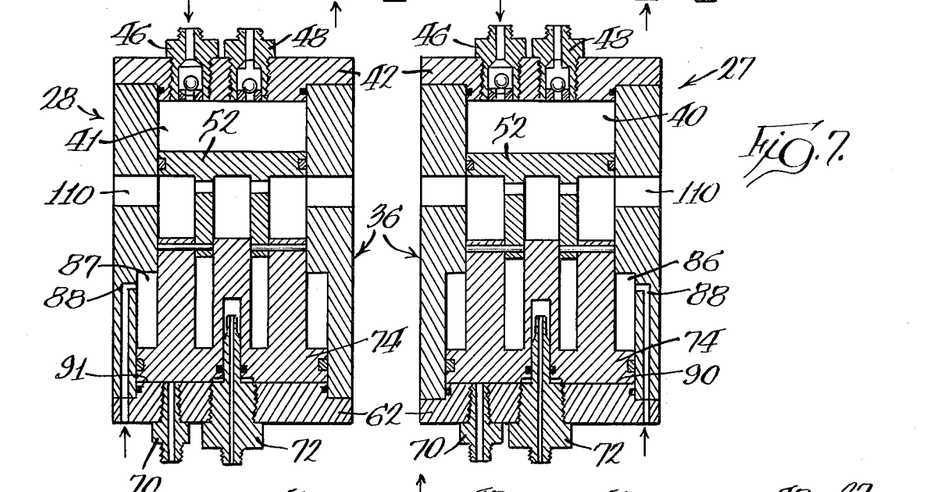
FIG. 7 is a schematic diagram depicting the two pump assemblies being initially filled with fluid.

The 3-way valve 114 is then turned from its off position to one of its on positions to permit fluid to be drawn from the respective one of the containers 12 and 14. Referring to FIGS. 4 and 7, to begin operation, the push button 132 is held depressed for about 15 seconds so that both of the chambers 90 and 91 are vented through the control valve 134 or the push button 132. With the chambers 90 and 91 vented, the compressed air in chambers 86 and 87 forces both sets of pistons 52 and 74 down to draw fluid into both of the pump chambers 40 and 41 through the inlet valves 46.

Figure 8:
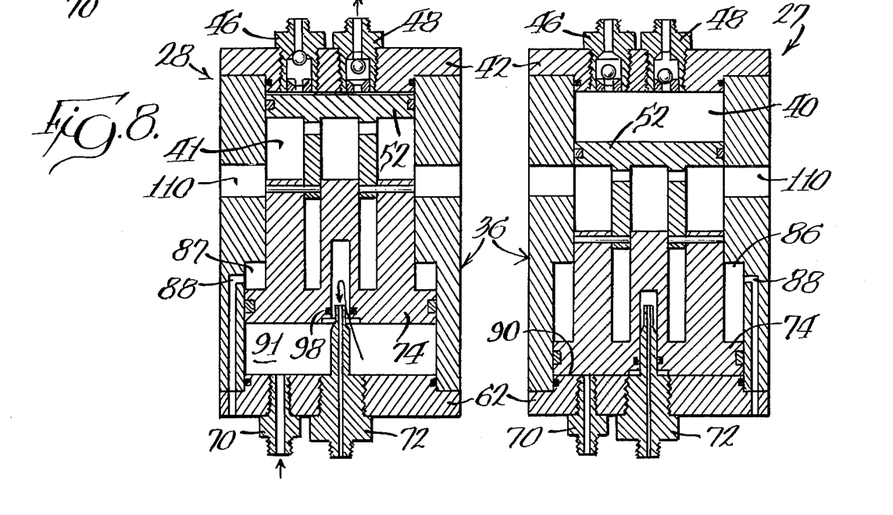
FIG. 8 is a schematic diagram depicting one of the pump assemblies executing a pumping stroke.

Referring to FIGS. 4 and 8, when the push button 132 is released, the valve 134 must be in one of its two end positions so that compressed air will be supplied to one only of the chambers 90 and 91. Thus, only one of the piston sets 52 and 74 of the assemblies 27 and 28 will be biased upward. Upon the start up of the systems, fluid will be pumped through the outlet valve 48 of the one pump assembly into the empty outlet line 118 and gun hose 15 (FIG. 1) to fill the same. Once the gun line 118 and hose 15 are filled and the fluid therein fully pressurized, the pistons 52 and 74 will stall out and no longer move upward as they are held in place by a hydraulic pressure lock. The hydraulic lock is released and fluid is supplied to the gun upon triggering the gun.

Figure 9:
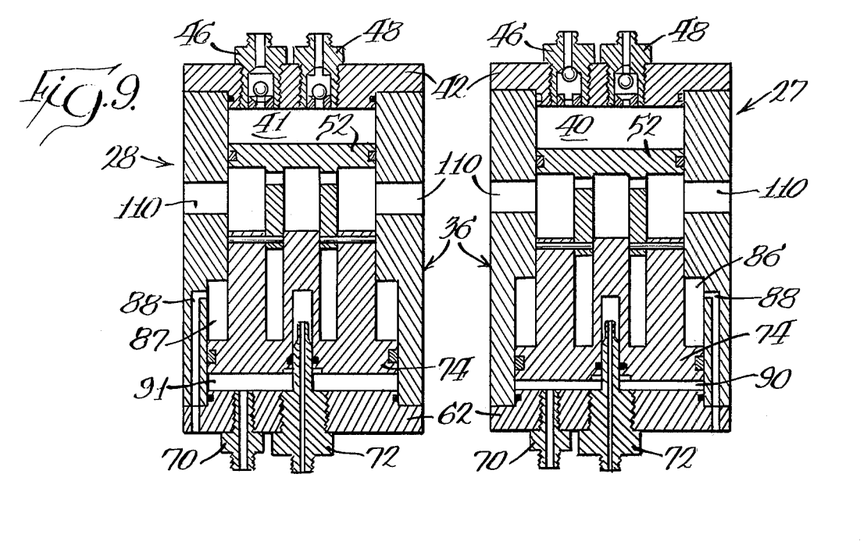
FIG. 9 is a schematic diagram depicting one of the pump assemblies being filled with fluid while the other assembly executes a pumping stroke.

Referring to FIGS. 4 and 9, assuming both of the pump chambers 40 and 41 are filled with fluid, triggering of the spray gun 16 to a open position will result in one set of pistons 74 and 52 in one of the assemblies, say 27, (but not both) to move upward. Only one set of pistons 74 and 52 can move upward since the control valve 134 must be in either of its two end positions and thus supplies compressed air to only one of the chambers, say 90, while venting the other chamber 91. As the piston 52 of assembly 27 moves upward, it pumps fluid out its outlet valve to the gun so long as the gun is triggered open. The fluid is pumped to the gun at the same pressure as that of the compressed air acting in chamber 90 since the area of piston 74 in chamber 90 minus the area of that same piston in chamber 86 equals the area of the pump piston 52. Thus, the setting of the air regulator 124 determines the pressure at which the fluid is supplied to the gun. By observing the flow meter 120 and adjusting the air pressure by the regulator, the proper rate of flow of fluid to the gun is readily set. Fluid flow continues until the gun is triggered off and automatically resumes when the gun is triggered on.

Figures 10, 11:
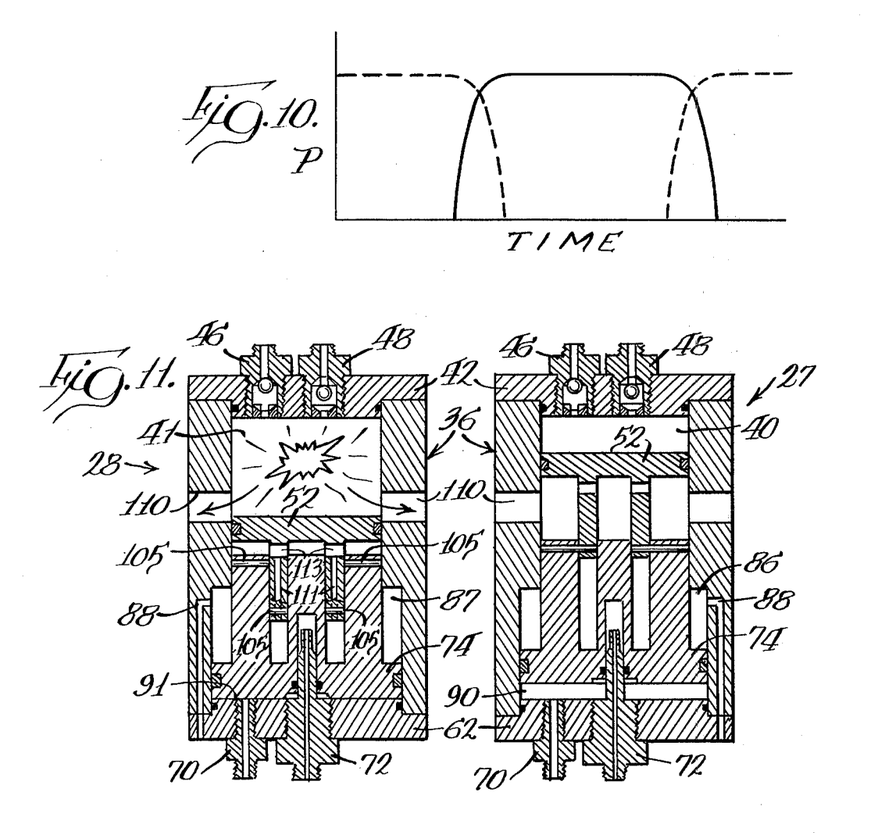
FIG. 10 is a graphic representation of the delivery pressure of the pump assemblies as a function of time.
FIG. 11 is a schematic diagram depicting the operation of the pump assemblies upon occurance of an explosion in one of the assemblies.

Referring to FIG. 9, as the piston 74 nears the top of its upward stroke, the upper end of stem 94 of the pilot connector 72 in assembly 27 is exposed and compressed air from the chamber 90 enters the hollow stem and is supplied to the pilot line 138 to shift the spool of the control valve 134 to the left, cutting off compressed air to chamber 90 of assembly 27 and venting the same, while initiating supply of compressed air to the chamber 91 of assembly 28 and ceasing venting of that chamber. Thus a pumping stroke of the pistons 52 and 74 of the assembly 28 is initiated. Due to the previously established head of air pressure in the chamber 90, the pistons of assembly 27 will continue upward momentarily until the pressure of fluid supplied by the other assembly 28 is greater than that of the assembly 27. Thereafter, as the chamber 90 is vented, the pistons 52 and 74 of assembly 27 will move downward due to the air pressure in chamber 86, thereby to perform an intake or suction stroke to refill the pump chamber 40. As is apparent from the foregoing, and as shown in FIGS. 9 and 10, continuous pumping by one or the other of the assemblies 27 and 28 occurs automatically as long as the trigger of the gun 16 is held open to spray the fluid, and the fluid will be supplied at a substantially constant rate and pressure with only minor variation. This is clearly shown by the composite pressure curves illustrated in FIG. 10, wherein the output of the pump assembly 27 is indicated in dotted lines and the output of the pump assembly 28 in indicated in solid lines. As shown, with the assembly 27 supplying fluid at full pressure, the assembly 28 is quiescent. Then, as the pistons of the assembly 27 approach their topmost position, the pilot stem is uncovered, the spool valve is moved and air is supplied to the chamber 91 of the assembly 28, the output pressure of the assembly 28 is quickly developed and assumes full pressure just as the pressure of the assembly 27 starts to diminish. This same cycle is then repeated as the pistons of assembly 28 approach the top of their stroke. Thus, there is only a very minor and inconsequential variation in pressure as the system changes over from one pump assembly to the other. In practice, this results in no more than a flicker of change at the flow meter and no discernible change at the spray gun. Thus, fluid supply is in effect constant as to both flow rate and pressure.

Whenever desired, the air regulator 124 can be adjusted to achieve the desired fluid flow rate as indicated by the flow guage 120. If the gun trigger is released, pumping stops automatically, and then resumes automatically when the gun is triggered on.

Should the container 12 or 14 supplying fluid be nearly empty, the selector valve 114 is simply rotated to bring the other container into fluid communication with the pump inlet. The empty container can then be quickly and conveniently replaced so that a continuous source of supply is maintained at the pumps. When it is desired to shut the system down, the selector valve 114 is moved to its closed position and one or two pumping strokes executed to empty the assemblies 27 and 28 of fluid.

Referring to FIG. 11, should for one reason or another the fluid in either of the pump chambers react violently, decompose or explode, the following will occur: The high pressure generated in the chamber will drive the piston assembly downward against the air pressure and shear the pins 105, thereby to release the piston 52 for downward telescopic movement into the piston 74. This movement immediately relieves the pressure within the chamber by increasing the volume of the chamber several times over. Substantially simultaneously, as the piston 52 moves past the ports 110, the high pressure in the chamber is rapidly, but safely, further reduced by exhausting the generated gases out the ports 110. The gases exiting from the ports 110 are deflected by the shield 29 so that gases and/or catalyst are not blown onto the operator. The spring 31 retaining the shield in place permits the shield to flex to absorb the forces while diverting the gases and/or fluid, and prevents the shield from being blown completely off. Thus, the explosive forces are absorbed and rapidly dissipated to minimize the adverse effects thereof. Also, the pump assemblies are ruggedly constructed to absorb the high pressures and forces of an explosion, which factor taken together with the pressure relieving structural features thereof, causes the assemblies to contain and safely dissipates the explosive forces and at the same time prevent propagation or spread of the explosion.

As initial pressure and shock relief is taking place as above described, and the piston 74 of the assembly 28 is being driven downwardly, residual air in the pilot stem 96 and pilot line 138 is compressed to shift the spool of valve 134 thereby causing air to be delivered to the lower side of the piston 74 of the assembly 27 to empty the chamber 40 of fluid. The spool of valve 134 is thereupon shifted again, but there now being no resistance to upward travel of the piston 74 of the assembly 28 that piston is rapidly driven to its uppermost position and the valve spool shifted again. In the interim, the piston of assembly 27 has not had sufficient time to return to its lowermost position, so only a small fraction of the normal amount of fluid is drawn into the chamber and then promptly discharged due to reversal of the spool of the valve 134. This cycle continues with ever decreasing amounts of fluid being drawn into the pump chamber 40 of the assembly 27 until the pistons of both air motors stall out at the upper ends of their strokes due to pneumatic pressure balance though the pneumatic system, which takes place in a very few moments following an explosion or other similar reaction. Thus, the forces generated by the reaction or exlosion are rapidly dissipated, the pump chambers are quickly emptied of fluid and the pumping action is stopped to mitigate propagation and/or spread of the explosive reaction. Following such an explosion due to contamination caused thereby, it would be necessary to replace all system components exposed to the explosion, and possibly the entire dispensing system 10, but nevertheless the explosion is contained and controlled or managed with complete safety.

The cyclic safety action of the dispensing system last-aboved described will also take place automatically in the event of any other mishap in the system. For example, if the fluid hose 15 leading to the spray gun should rupture, the back pressure at the outlet valve of each piston chamber would be nil and each chamber would rapidly be exhausted of fluid in the pressure or output stroke thereof. The period of time required for discharge of one chamber would not be sufficient to accommodate intake of a full charge in the other chamber, so that both pumps would operate with ever decreasing piston strokes until the pistons stalled out at the upper ends of their strokes, with the chambers empty and pneumatic pressures balanced. In this manner, the flow of fluid is stopped automatically with very little loss of fluid and essentially without creation of a potentially hazardous condition. The time required to reach the stall out or pump stopped condition may be adjusted within limits by adjustment of the size of the piston chamber vent ports in the valve 134. To restart the pumping action when the hose 15 has been repaired or replaced, or other appropriate repair has been made, it is only necessary to depress the push button valve 132.

Another advantage of the dispensing system is that should the operator inadvertently forget to switch to a full fluid or catalyst container 12 or 14 before the container 14 or 12 being used is depleted, the pump assemblies will stall or cease operation and, thus, alert the operator. After one of the pump assemblies has drawn air into its pump chamber, the succeeding pumping strokes of that assembly will be completed before the other assembly can complete its intake strokes. Such occurs inasmuch as intake strokes, whether of air or catalyst, take substantially longer than discharge strokes of air, because air, unlike catalyst, is compressible and can be rapidly discharged into the outlet manifold before the other assembly completes its intake stroke, thus precipitating the above-described automatic stalling of the pump assemblies.

By virtue of the above-described structure and mode of operation, the dispensing system of the invention provides for essentially complete safety in the handling of low stability fluids. The potential for fluid contamination is reduced to the greatest extent possible. The fluid is not exposed to or mixed with and cannot be contaminated by the compressed air or other motor operating fluid. The fluid is pressurized in very small incremental quantities. Heat normally generated in a pressurizing action is rapidly dissipated by relatively large masses of materials, especially aluminum, having high heat conductivity and large exposed surface areas. Mechanical shock to and other abuses of the fluid are eliminated. Consequently, the potential for violent reaction or explosion is greatly minimized.

Should an explosion occur despite these precautions, the explosion will be of low magnitude since the quantity of fluid under pressure is very small, a maximum of no more than two ounces in either pump chamber, so that the explosion is controllable or manageable, especially in relation to prior art systems wherein large quantities of the fluid, for example several gallons, were pressurized in a common vessel that could react like a bomb. Moreover, the invention provides means in the system for controlling and dissipating the energy of an explosion for reducing the same to a manageable level and preventing injury to personnel and destruction of premises.

While only the preferred embodiment of the invention has been shown and described, it is to be appreciated that various changes, rearrangements and modifications may be made therein without departing from the scope of invention, as defined by the appended claims.

What is claimed is:

1. A dispensing system for low stability fluids comprising pump means having low volumetric capacity for pumping said fluid, inlet means for connecting an inlet to said pump means with original containers of a low stability fluid and for maintaining the fluid free of contamination and in an unpressurized state, outlet means for said pump means, motor means operatively connected to said pump means for operating said pump means to draw fluid from the fluid container into the pump means and to pressurize the fluid in the pump means and outlet means, whereby the source of supply of the fluid is not pressurized and only a small incremental quantity of the fluid is pressurized at any given time, and means for disabling said pump means in the event of development of a predetermined excessive pressure in said pump means, said means for disabling said pump means comprising a releasable connection between said motor means and said pump means for disconnecting said pump means for said motor means without damage to either, said pump means including a pump chamber of low volumetric capacity, a contiguous chamber which is normally not in communication with said pump chamber, and a pumping member in said pump chamber connected with said motor means through said releasable connection and separating said pump chamber from said contiguous chamber, said releasable connection between said motor means and said pump means upon releasing accommodating movement of said pumping member out of said pump chamber and into said contiguous chamber to establish communication between said chambers thereby to instantly and substantially increase the effective volume of the pump chamber and effectively reduce the excessive pressure.

2. The dispensing system of claim 1, including vent ports in said contiguous chamber for venting excessive fluid pressure upon release of said releasable connection and expansion of the volume of said pump chamber.

3. The dispensing system of claim 1, wherein the pump means comprises alternately active pumping pumping members for maintaining an essentially constant pressure on the fluid in said outlet means.

4. The dispensing system of claim 1, wherein said pump means comprises a pair of reciprocable piston pumps each of a very low volumetric capacity, said motor means comprises a pair of motors operatively connected respectively to said pumps for reciprocating the same, and said system includes control means for causing each of said motors to execute a discharge stroke of the respective pump piston only when the other pump piston has substantially completed a discharge stroke, and for causing said motors to execute an intake stroke of the respective pump piston only when the other pump piston is executing a discharge stroke, whereby only one of the pumps pressurizes a very small incremental quantity of the fluid at any given time but the fluid in said outlet means is continually pressurized.

5. A dispensing system for low stability fluids comprising pump means having low volumetric capacity for pumping said fluid, inlet means for connecting an inlet to said pump means with original containers of a low stability fluid and for maintaining the fluid free of contamination and in an unpressurized state, outlet means for said pump means, motor means operatively connected to said pump means for operating said pump means to draw fluid from the fluid container into the pump means and to pressurize the fluid in the pump means and outlet means, whereby the source of supply of the fluid is not pressurized and only a small incremental quantity of the fluid is pressurized at any given time, and means for disabling said pump means in the event of development of a predetermined excessive pressure in aid pump means, said means for disabling said pump means comprising a releasable connection between said motor means and said pump means for disconnecting said pump means from said motor means without damage to either, said pump means comprising a pair of reciprocable piston pumps each of a very low volumetric capacity, said motor means comprising a pair of motors operatively connected respectively to said pumps for reciprocating the same, and said system including control means for causing each of said motors to execute a discharge stroke of the respective pump piston only when the other pump piston has substantially completed a discharge stroke, and for causing said motors to execute an intake stroke of the respective pump piston only when the other pump piston is executing a discharge stroke, whereby only one of the pumps pressurizes a very small incremental quantity of the fluid at any given time but the fluid in said outlet means is continually pressurized, each pump including a relatively elongate cylinder having inlet and outlet valves adjacent one end thereof, the respective motor reciprocating the respective piston only in a portion of the cylinder adjacent said one end thereof, and said releasable connection including shearable means for connecting the piston to the motor, said shearable means being adapted to shear upon occurrence of excessive pressure in said one end of said cylinder to permit said piston to move beyond its normal stroke of movement away from said one end of said cylinder and thereby substantially increase the volume of the pump chamber to relieve the pressure therein.

6. A dispensing system for low stability fluids comprising pump means having low volumetric capacity for pumping said fluid, inlet means for connecting an inlet to said pump means with original containers of a low stability fluid and for maintaining the fluid free of contamination and in an unpressurized state, outlet means for said pump means, and motor means operatively connected to said pump means for operating said pump means to draw fluid from the fluid container into the pump means and to pressurize the fluid in the pump means and outlet means, whereby the source of supply of the fluid is not pressurized and only a small incremental quantity of the fluid is pressurized at any given time, said pump means comprising a pair of reciprocable piston pumps each of a very low volumetric capacity, said motor means comprising a pair of motors operatively connected respectively to said pumps for reciprocating the same, and said system including control means for causing each of said motors to execute a discharge stroke of the respective pump piston only when the other pump piston has substantially completed a discharge stroke, and for causing said motors to execute an intake stroke of the respective pump piston only when the other pump piston is executing a discharge stroke, whereby only one of the pumps pressurizes a very small incremental quantity of the fluid at any given time but the fluid in said outlet means is continually pressurized, each pump including a relatively elongate cylinder having inlet and oulet valves adjacent one end thereof, the respective motor reciprocating the respective piston only in a portion of the cylinder adjacent said one end thereof, and including shearable means for connecting the piston the motor, said shearable means being adapted to shear upon occurrence of excessive pressure in said one end of said cylinder to permit said piston to move beyond its normal stroke of movement away from said one end of said cylinder and thereby substantially increase the volume of the pump chamber to relieve the pressure therein, and vent ports in said cylinder adjacent the end thereof opposite said one end for further relieving excessive pressure.

7. A dispensing system for low stability fluids comprising pump means having low volumetric capacity for pumping said fluid, inlet means for connecting an inlet to said pump means with original containers of a low stability fluid and for maintaining the fluid free of contaminants and in an unpressurized state, outlet means for said pump means, and motor means operatively connected to said pump means for operating said pump means to draw fluid from the fluid container into the pump means and to pressurize the fluid in the pump means and outlet means, whereby the source of supply of the fluid is not pressurized and only a small incremental quantity of the fluid is pressurized at any given time, said pump means comprising a pair of reciprocable piston pumps each of a very low volumetric capacity, said motor means comprising a pair of motors operatively connected respectively to said pumps for reciprocating the same, and said system including control means for causing each of said motors to execute a discharge stroke of the respective pump piston only when the other pump piston has substantially completed a discharge stroke, and for causing said motor to execute an intake stroke of the respective pump piston ony when the other pump piston is executing a discharge stroke, whereby only one of the pumps pressurizes a very small incremental quantity of the fluid at any given time but the fluid in said outlet means is continually pressurized, said control means initiating a discharge stroke of each piston immediately upon substantial completion of the discharge stroke of the other piston and including means operatively associated with each motor for retarding the intake stroke of the respective piston whereby, should pressure be lost in either of said pumps or said outlet means, one motor will rapidly execute a discharge stroke of the respective piston before the other motor and piston have completed an intake stroke, said other motor and piston will then rapidly complete a discharge stroke before the one motor and piston will have completed an intake stroke, and the motors and pistons will progressively execute shorter strokes until both stall out at the end of the discharge strokes thereof, thereby rapidly terminating the pumping action in the event of failure of the system.

8. A dispensing system for low stability fluids comprising a pair of reciprocable piston pumps each having a cylinder defining a pump chamber of low volumetric capacity, a piston reciprocable in said chamber, and inlet and outlet valves communicating with said chamber; a pair of reciprocable fluid pressure operated motors each having a cylinder and a piston reciprocable in said cylinder and defining with said cylinder a pair of fluid pressure chambers to opposite sides of said motor piston for moving said piston in opposite directions; the piston of each motor being connected to the piston of a respective pump for reciprocating the pump piston through an intake stroke and a discharge stroke; an intake manifold connected to the inlet valves of the pumps and adapted to be connected to a source of supply of low stability fluid and including means for mitigating contamination of the fluid; an outlet manifold connected to the outlet valves of the pumps and adapted for connection to a point of use of the low stability fluid; and a control system for supplying operating fluid under pressure to said motors, said control system including means for supplying operating fluid to said motors for operating the same to effect the intake strokes of the pump piston, first valve means for selectively supplying operating fluid to the respective ones of said motors one at a time for operating said motors normally to effect the discharge strokes of the pump pistons as a function of the back pressure in said outlet manifold, and second valve means associated with each of said motors for operating said first valve means as the piston of the respective motor approaches the end of the dishcarge stroke of the respective pump piston for discontinuing supply of operating fluid to the discharge stroke side of the respective motor piston and initiating supply of operating fluid to the discharge stroke side of the piston of the other motor; whereby the source of supply of the low stability fluid remains unpressurized, the low stability fluid is pressurized only in small incremental quantities by only one pump piston at any given time, the low stability fluid in the outlet manifold is continuously pressurized, and the dispensing system operates automatically as a function of demand for low stability fluid.

9. The dispensing system of claim 8, including means in said control system for causing said motors to effect the intake strokes of said pump pistons within a predetermined period of time less than that required for a normal discharge stroke of a pump piston but longer than that required for a discharge stroke when there is little or no back pressure in the respective pump or said outlet manifold whereby, should there be a loss of pressure in said outlet manifold or should one of the pumps or motors fail, one motor will effect a rapid discharge stroke before the other motor can complete an intake stroke, the other motor will then effect a rapid discharge stroke before the one motor can complete an intake stroke, and the motors will progressively execute shorter strokes of movement until both stall out at the end of discharge strokes thereof, thereby rapidly terminating the pumping action in the event of failure of the system.

10. The dispensing system of claim 9, including a third valve for venting operating fluid from the discharge stroke side of the pistons of both motors when the same have stalled out at the end of their discharge strokes for causing both motors to execute intake strokes of the pump pistons thereof, thereby to restart the pumping action.

11. The dispensing system of claim 8, wherein said intake manifold includes a pair of suction lines for insertion in original containers of low stability fluid and each suction line includes means for detachable connection to such original containers for receiving said containers and maintaining the fluid therein free of contamination and in an unpressurized state, and valve means for selectively establishing communication between said intake manifold and one or the other of said suction lines, whereby low stability fluid may be withdrawn from one container until it is depleted, the valve then manipulated to cause fluid to be withdrawn from the other container, and the depleted container removed and replaced by a full container while fluid is being withdrawn from said other container.

12. The dispensing system of claim 8, wherein each pump and motor set includes a releasable connection between the respective pump piston and motor piston, the pump cylinder is of a length greater than the pump chamber and defines a contiguous chamber into which the pump piston may move, and said contiguous chamber includes vent ports therein; said releasable connection being adapted to release upon occurence of excessive fluid pressure in the pump chamber whereupon the pump piston may move into said contiguous chamber and uncover said vent ports and thereby relieve the excessive pressure by instantly and substantially enlarging the volume of the chamber in which the fluid is contained and venting such chamber through said ports.

13. The dispensing system of claim 12, including resilient, deflectable shield means surrounding said vent ports exteriorly of the pump cylinder for safely diverting fluids exiting therefrom.

14. The dispensing system of claim 8, wherein each pump and motor set comprises an integral cylinder defining therein coaxial pump and operating fluid pressure chambers, the pump and motor pistons being coaxial and interconnected for conjoint reciprocation in said chambers.

15. The dispensing system of claim 14, wherein the two pistons are mounted for relative collapsing movement, the two pistons are normally interconnected for conjoint reciprocation in relatively extended positions by shear pins, and said cylinder includes a normally void space between said pistons of a size to receive the pump piston; said shear pins being adapted to shear upon occurence of excessive fluid pressure in said pump chamber to release the pump piston for movement into said void space thereby to relieve the excessive pressure by subtantially enlarging the space within which the fluid is contained.

16. The dispensing system of claim 14, wherein the two cylinders are mounted in parallel side by side relationship and include common headers at the opposite ends thereof, the header at the pump chamber ends of said cylinders containing said intake and outlet manifolds, and the header at the motor ends of said cylinders containing said first valve means and said operating fluid supply means.

17. The dispensing system of claim 16, including container receiving brackets adjacent the two cylinders, the header at the pump chamber ends of said cylinders including suction tubes extending outwardly to each of said brackets and container attachment means on each suction tube; said brackets, tubes and attachment means being adapted for detachable reception of original containers of low stability fluid and for maintaining the same free of contamination.

18. The dispensing system of claim 8, wherein said second valve means associated with each of said motors comprises a pilot stem extending into the motor piston and having fluid connection with said first valve means, said motor piston having sealed slidable engagement with said pilot stem thoughout the majority of its stroke of movement but uncovering said stem and opening the same to the operating fluid on the discharge stroke side of the respective motor piston as the piston approaches the end of its discharge stroke.

19. The dispensing system of claim 8, including a flow meter in communication with said outlet manifold and means in said control system for varying the pressure at which the operating fluid is supplied to the motors for adjusting the rate of flow of the low stability fluid to the point of use.

* * * * *